Jan. 22, 1957  F. E. EYSTER  2,778,180
LID REMOVING APPARATUS
Filed Feb. 21, 1955  3 Sheets-Sheet 1
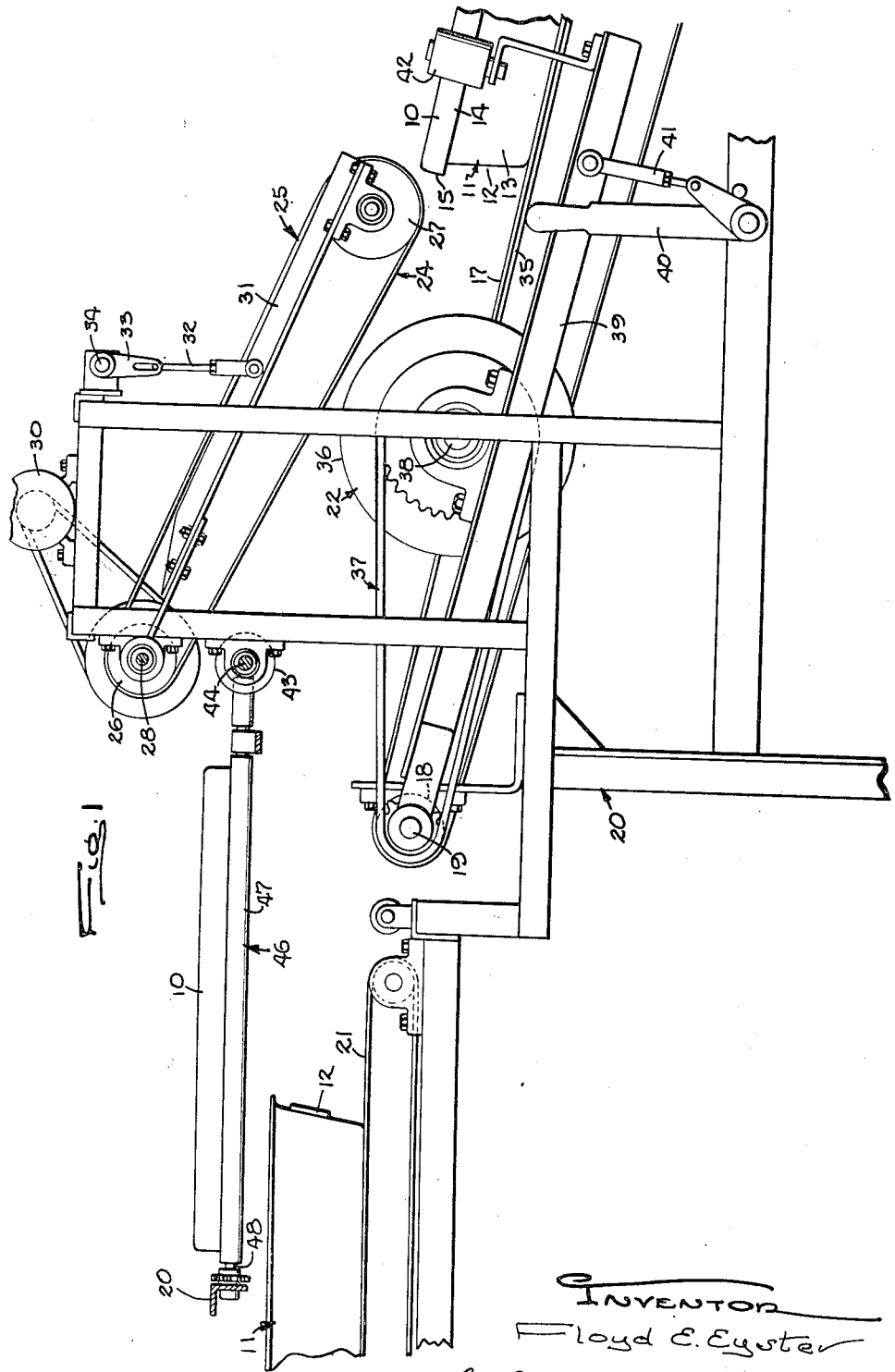
INVENTOR
Floyd E. Eyster
By Carlson, Pitzner, Hubbard-Wolfe
ATTORNEY

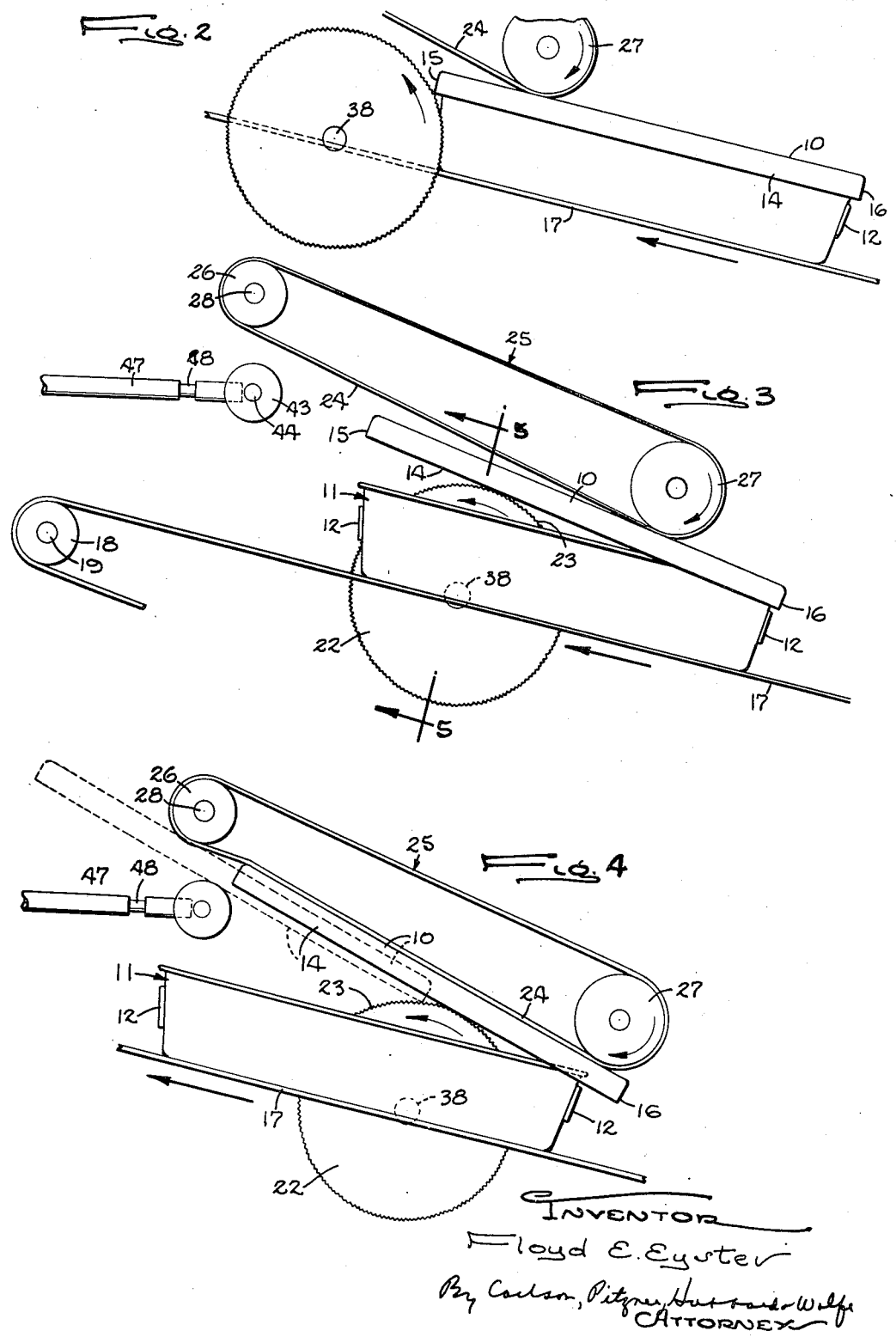

Jan. 22, 1957
F. E. EYSTER
2,778,180
LID REMOVING APPARATUS
Filed Feb. 21, 1955
3 Sheets—Sheet 3
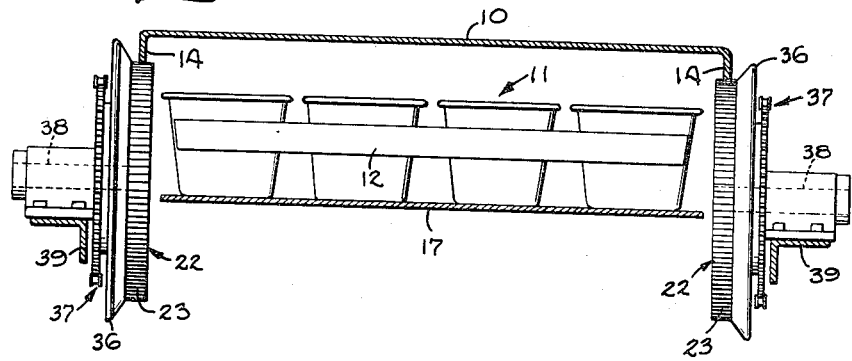
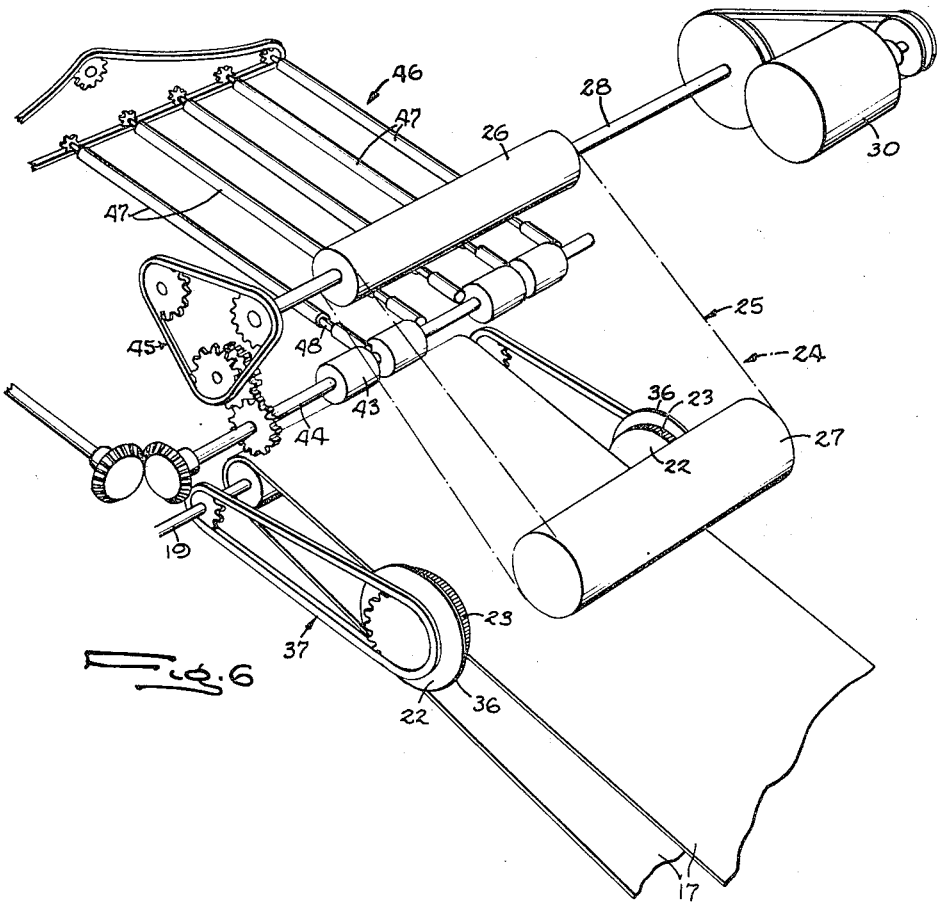
INVENTOR
Floyd E. Eyster
By Carlson, Pitzner, Hubbard & Wolfe
ATTORNEYS

United States Patent Office 2,778,180
Patented Jan. 22, 1957

2,778,180

LID REMOVING APPARATUS

Floyd E. Eyster, Rockford, Ill.

Application February 21, 1955, Serial No. 489,719

12 Claims. (Cl. 53—381)

This invention relates to apparatus for removing a lid from an article such as a rectangular set of bread pans which is smaller than the lid so that peripheral edges of the latter overhang the side and end walls of the article. More particularly, the invention relates to delidding apparatus of the type in which a covered bread pan set is supported and advanced by a horizontally disposed conveyor between lifting elements spaced apart to engage the overhanging lid edges and raise the lid while permitting passage of the pan set with the conveyor between and beyond the elements.

The general object of the invention is to provide improved delidding apparatus which insures removal of lids from each of a series of pan sets advancing successively through the apparatus, which maintains positive control of the lids both during and after their removal from the pan sets, and which is simple in construction and operation.

Another object is to maintain control over each lid both after it contacts the lifting elements and while it is lifted from the article by pressing the lid against the elements during the full time of its engagement therewith.

A further object is to insure travel of the lid upwardly onto the lifting elements and away from the pan set by applying advancing forces to the covered set including the lid at three different points during lifting of the lid from the set.

A more detailed object is to apply an advancing force to the covered pan set by a pressure member which urges the covered set against the conveyor and the lid against the lifting elements to improve the traction between the conveyor and the set and between the lid and the lifting elements.

The invention also resides in the novel construction and arrangement of the lifting elements and a discharge conveyor element for maintaining control of a lid after its removal from the pan set.

Other objects and advantages of the invention will become apparent from the following detailed description taken in connection with the accompanying drawings, in which Figure 1 is a fragmentary side elevational view of a lid removing apparatus involving the novel features of the present invention.

Figs. 2, 3, and 4 are schematic views similar to Fig. 1 and showing successive steps in the removal of a lid from an article.

Fig. 5 is a sectional view taken along the line 5—5 of Fig. 3.

Fig. 6 is a fragmentary perspective view of the drive mechanism for the different parts.

The apparatus shown in the drawings to illustrate the present invention is especially adapted for removing the lid 10 from a covered generally rectangular set 11 of bread pans which are arranged side by side (Fig. 5) and are secured rigidly together as by crossbars 12 extending across and riveted to the ends of the pans. The lid 10 is of flat rectangular shape larger than the pan set and extends beyond opposite ends and the outer side walls 13 of the outer pans of the set. Side flanges 14 and end flanges 15 and 16 depending from the overhanging peripheral edges of the lid retain the latter on the pan set.

A pan set 11 to be uncovered rests on and advances endwise with a horizontally disposed conveyor 17 which, in this instance is an endless belt extending around and stretched between a drive roller (not shown) and an idler roller 18 fast on an idler shaft 19 journaled in a suitable framework 20 of angle bars. The drive roller is turned continuously to advance the upper run of the conveyor to the left as indicated by arrows in Figs. 2 to 4 through the lid removing apparatus and toward and onto a conveyor extension 21 which carries the delidded pan sets to suitable depanning apparatus.

Generally, the improved delidding apparatus is of the type comprising two lifting elements 22 spaced apart on opposite sides of the path of the pan set 11 on the conveyor 17 a distance greater than the width of the set between the outer pan walls 13 but less than the width of the lid 10 (Fig. 5) to engage the side flanges 14 and interrupt advance of the lid with the pan set while permitting continued movement of the latter past the elements. Lid engaging surfaces 23 of the lifting elements are inclined upwardly and forwardly of the direction of movement of the pan set from positions beneath the side flanges of the lid to positions above the tops of the pans so that the lid, after contact of its leading edge 15 with the lifting elements and while it continues to move forwardly, is elevated away from the pan set.

In accordance with the present invention, novel means is provided for propelling the lid 10 forwardly after its engagement with the lifting elements 22 and maintaining control of the lid during and after its separating movement from the pan set 11. This means comprises a pressure member 24 which is mounted behind the lifting elements a distance less than the length of the lid along the conveyor 17 and is movable vertically relative to the latter to engage the top of the lid and press the pan set downwardly against the conveyor thereby increasing the traction between the two. To increase the advancing force on the pan set further, the lid engaging surface of the pressure member preferably is advanced forwardly during its engagement with the lid. Control of the lid after the leading portions of the side flanges 13 thereof ride upwardly on the lifting surfaces 23 and pass above the tops of the pans is maintained by locating a part of the pressure member adjacent the lifting surfaces to perform the additional function of pressing the lid against these surfaces during the full time of engagement therewith.

In the present instance, the pressure member 24 comprises the lower run of an endless conveyor belt 25 extending upwardly across the tops of the lifting elements 22 from a position behind and below the latter and encircling and stretched between a drive roller 26 and an idler roller 27. The drive roller 26 is fast on a shaft 28 which is journaled in and is rotated by a motor 30 in a direction to advance the pressure belt forwardly.

To provide the relative vertical movement between the lower end of the pressure belt 24 and the pan conveyor 17 and yieldably urge the two toward each other, the idler roller 27 is weighted and is carried by the lower ends of angle bars 31 which, at their upper ends, are pivoted on the drive roller shaft 28 for swinging of the weighted roller up and down about this shaft. Intermediate its ends, each of the angle bars is suspended from the frame 20 by a link 32 of adjustable length (Fig. 1) pivotally connected at its lower end to the bar and having a pivotal and sliding connection at its upper end with an arm 33 projecting rigidly from a shaft 34. Each link 32 is adjusted to dispose the underside of the weighted roller and thus the lower end of the pressure belt slightly lower than the top of the covered pan set 11 resting on the pan conveyor 17 as shown in Fig. 1. A rigid backing plate 35 secured to the frame 20 and extending beneath the pan conveyor 17 maintains the latter in the proper relation to the pressure belt and the lifting elements 22.

The invention also contemplates a novel construction of the lifting elements 22 to cooperate with the pressure belt 24 in carrying the lid 10 away from the pan set 11 while avoiding the necessity of an additional conveyor for the lids. To this end, each lifting element is in the form of a disk or wheel which is rotatable about a horizontal axis extending transversely of the pan conveyor 17 and acts as a fulcrum about which the lid is swung upwardly and held against the pressure belt, the peripheries of the disks constituting the upwardly and forwardly inclined lid engaging surfaces 23. The latter are generally cylindrical and, at their outer ends, are formed with radial flanges 36 limiting edgewise shifting of the lid and retaining the same the cylindrical peripheries.

To increase the advancing force propelling the lid 10 upwardly and over the lifting disks 22, the latter also are power driven, this being accomplished through chain and sprocket connections 37 between the idler shaft 19 for the pan conveyor (Fig. 6) and shafts 38 supporting the disks. In this instance, the shafts 38 for the disks are journaled in bearings on angle bars 39 rigidly connected together and pivoted at one end on the idler shaft 19 for shifting of the disks vertically into and out of operative position by swinging of a lever 40 (Fig. 1). The latter is fulcrumed on the frame and is pivotally connected to the other ends of the angle bars through a link 41 which is adjustable to change the operating height of the disks above the pan conveyor 17. The angle bars 39 also support guide rollers 42 on opposite sides of the pan conveyor for engagement with the side flanges of the lid to center the latter relative to the lifting disks. Preferably, the gripping effect of the disk peripheries 23 on the lid flanges 14 is increased by serrating the peripheries as shown.

The simple construction of the lifting elements 22 as disks is made possible by the provision of a rotary conveyor element 43 which is supported beneath the pressure belt 24 ahead of the disks and cooperates with the belt to receive and retain control of the lid 10 as the latter is propelled forwardly and off from the disk peripheries 23. In the present instance, this discharge element is a horizontal roller extending traversely of the pressure belt and spaced along the latter from the disk peripheries a distance less than the length of the lid. The roller is fast on a shaft 44 journaled in the frame and connected to the pressure belt drive shaft 28 by a chain and sprocket connection 45.

From the discharge roller 43, the lid 10 advances onto a cross conveyor 46 extending horizontally across and above the pan conveyor extension 21 and comprising a series of horizontal rollers 47 fast on shafts 48. The latter are journaled in the frame and are rotated through a drive connection with the discharge roller shaft 44.

In the operation of the improved delidding apparatus, let it be assumed that the pan conveyor 17 is advancing continuously and that the motor 30 is energized for advance of the lifting disks 22, the pressure belt 24, and the discharge and cross conveyor rollers 43 and 47. While the peripheral speeds of the disks, the pressure belt, and the discharge roller are the same, it is preferred to advance the pan conveyor at a slightly higher speed to assist the pressure belt and the lifting disks in separating the lid 10 from the pan set 11.

As the leading edge 15 of a covered pan set 11 resting on and advancing with the conveyor 17 contacts the lower end of the pressure belt 24 beneath the weighted roller 27, the latter is lifted thereby and, acting through the pressure belt, presses on the top of the lid 10 to urge the pan set downwardly against the rigidly backed conveyor, thereby assisting gravity in providing traction between the conveyor and the bottom of the pan set. At the same time, an advancing force is applied to the lid by the pressure belt 24 so that, when the leading edge of the lid contacts the disk peripheries 23 as shown in Fig. 2, the disks are assisted in urging the lid upwardly and over their peripheries, not only by the pan conveyor which acts through the pan set on the depending front flange 15 of the lid, but also, by the pressure belt which acts directly on the lid.

When the lower end of the front flange 15 of the lid is raised above and clears the top of the pan set 11, the side flanges 14 of the lid advance along the upper sides of the disk peripheries 23 as shown in Fig. 3 and the latter act as fulcrums for swinging of the leading end of the lid toward the intermediate portion of the pressure belt by downward pressure of the weighted roller 27 on the trailing end portion of the lid. Due to the faster speed of the pan conveyor 17, the pan set tends to move ahead of the lid leaving the latter supported solely by the disks and the pressure belt after the pan set has advanced out of contact with the lid as shown in Fig. 4. Continued advance of the lid between the disks and the pressure belt projects the leading edge 15 of the lid between the belt and the discharge roller 43 which cooperate to retain control of the lid and propel the same onto the cross conveyor 46.

It will be apparent that the application of advancing forces to the covered pan set 11 at three separate points upon initial engagement of the lid 10 with the lifting disks 22 tends to insure elevation of the leading edge 15 of the lid over the disk peripheries 23 and away from the pan set. Such elevation is further insured by the location and mounting of the pressure belt 24 for pressing the lid against the disks continuously while the lid contacts the disks. Due to the novel arrangement of the disks and the discharge roller 43, positive control of the lid is retained as it is propelled forwardly away from the disk peripheries.

I claim as my invention:

1. In lid removing apparatus, the combination of, a horizontally disposed first conveyor for supporting and advancing a covered article endwise along a predetermined path, a pair of lifting elements spaced apart on opposite sides of said path for the passage of the article between them and for engagement with the undersides of overhanging edges of the lid on the article and extending upwardly and forwardly along said conveyor from points below the latter to upwardly facing surfaces on the elements above the article and a second conveyor having a lower run moving in the same direction as said first conveyor and extending upwardly above the lifting elements at an angle relative to the first conveyor from a point disposed below the top of the lid and behind said lifting elements a distance shorter than the lid in the direction of movement of the conveyors means supporting said lower run of said second conveyor for bodily swinging movement of the leading end thereof toward and away from said first conveyor and yieldably urging the same downwardly to said point for engagement with the lid to swing the trailing end of the latter downwardly and the leading end thereof about said lifting element surfaces and upwardly against the run for movement with the run away from the article as the article passes between the lifting elements, and a rotary element supported beneath said second conveyor at a point spaced along the latter from said lifting elements a distance less than the length of the lid for cooperation with the second conveyor to retain control of the lid while propelling the same forwardly away from the lifting elements.

2. In apparatus for removing from a rectangular article a lid having side edges overhanging the side walls of the article, the combination of, a horizontally disposed first conveyor for supporting and advancing a covered article along a predetermined path, a pair of lifting elements spaced apart on opposite sides of said path a distance greater than the width of the article but less than the width of the lid to engage said overhanging lid edges and extending upwardly above the article and forwardly along said conveyor from positions below said lid when the latter is resting on the article and the article is resting on the conveyor, a second conveyor spaced above said first conveyor and said lifting elements to engage the top of a lid on the latter, means for advancing said second conveyor in the same direction as said first conveyor, and a rotary element supported beneath said second conveyor at a point spaced along the latter from said lifting elements a distance less than the length of said lid for cooperation with the second conveyor to retain control of the lid while propelling the same forwardly away from the lifting elements.

3. In lid removing apparatus, the combination of, a conveyor for supporting and advancing a covered article along a predetermined path, a pair of disks having lid engaging surface on their peripheries spaced apart transversely of said path a distance greater than the width of the article but less than the width of a lid thereon to engage the lid of a covered pan set advancing along the path, means rotatably supporting said disks for movement of points on said peripheries upwardly above the lid and forwardly along the path from positions below the edges of the lid overhanging the article, a pressure member having lid engaging surfaces spaced above said conveyor and said disks to engage the top of a lid on the disks and press the same against the disks, means for advancing said lid engaging surfaces of said disks and said member forwardly and in the same direction along said path, said member cooperating with said disks to lift the lid and carry the same upwardly over the disks and away from the article, and flanges projecting radially and outwardly from said disk peripheries and spaced apart a distance greater than the width of the lid to engage side edges of the lid and maintain the same centered on the peripheries.

4. In lid removing apparatus, the combination of, a horizontally disposed first conveyor for supporting and advancing a covered article along a predetermined path, a pair of lifting elements spaced apart transversely of said path a distance greater than the width of the article but less than the width of a lid thereon and extending upwardly above the lid from positions below edges of the lid overhanging the article, a second conveyor having a lower run extending longitudinally of and above said first conveyor and forwardly across said lifting elements from a point behind and below the latter where the run engages the top of the lid of a covered article on the first conveyor, means for advancing the lid engaging surfaces of said second conveyor forwardly along said path at one speed, means for advancing said first conveyor forwardly along said path at a faster speed than said second conveyor, said second conveyor cooperating with said first conveyor to advance the lid against and onto said lifting elements and with the latter to lift the lid upwardly over the elements and away from the article.

5. In lid removing apparatus, the combination of, a horizontally disposed first conveyor for supporting and advancing a covered article endwise along a predetermined path, a pair of lifting elements spaced apart on opposite sides of said path for the passage of the article between them and for engagement with the undersides of overhanging edges of the lid on the article and extending upwardly and forwardly along said conveyor from points below the latter to upwardly facing surfaces on the elements above the article, and a second conveyor having a lower run moving in the same direction as said first conveyor and extending upwardly above the lifting elements at an angle relative to the first conveyor from a point disposed below the top of the lid and behind said lifting elements a distance shorter than the lid in the direction of movement of the conveyors, and means supporting said lower run of said second conveyor for bodily swinging movement of the leading end thereof toward and away from said first conveyor and yieldably urging the same downwardly to said point for engagement with the lid to swing the trailing end of the latter downwardly and the leading end thereof about said lifting element surfaces and upwardly against the run for movement with the run away from the article as the article passes between the lifting elements.

6. In lid removing apparatus, the combination of, a horizontally disposed first conveyor for supporting and advancing a covered article along a predetermined path, a second conveyor extending longitudinally of and above said first conveyor and having a lower run moving in the same direction as the latter and extending upwardly from a position below the top of the lid on the article resting on the first conveyor, means supporting said second conveyor for movement of the lower end of the lower run thereof bodily toward and away from said position and yieldably urging the lower end downwardly into the position, and a pair of disks rotatably mounted on opposite sides of said path and spaced apart for passage of the article between them and for engagement of their peripheries with overhanging edges of the lid extending beyond the article, said disk peripheries moving upwardly above the article and forwardly in the direction of movement of said conveyors from points disposed below said lid edges and spaced forwardly of said lower end of said second conveyor a distance less than the length of the lid whereby the latter is fulcrumed on said peripheries for swinging of its leading end upwardly against said second conveyor under downward pressure of said lower end of said second conveyor on the trailing lid end.

7. In lid removing apparatus, the combination of, a horizontally disposed conveyor for supporting and advancing the covered article along a predetermined path, lifting elements spaced apart on opposite sides of said path to permit passage of the article between them and to engage the undersides of overhanging edges of the lid on the article and extending upwardly above the article and forwardly along the conveyor from points below the lid edges for raising the lid away from the article as the latter advances with the conveyor, a pressure member having a lid engaging surface spaced above said conveyor behind said lifting elements a distance shorter than the lid in the direction of movement of the conveyor, means supporting said member for movement bodily toward and away from said conveyor and yieldably urging the member downwardly to a position below the top of the lid for engagament with the latter during its advance along the conveyor with the article, and means for advancing said lid engaging surface of said member in the direction of movement of said conveyor to assist the latter in propelling the covered article toward said lifting elements and the lid into engagement with the elements and upwardly away from the article.

8. In apparatus for removing from a rectangular article a lid having side edges overhanging the side walls of the article, the combination of, a horizontally disposed conveyor member for supporting and advancing the covered article along a predetermined path, two lifting elements disposed on opposite sides of said path and spaced apart a distance greater than the width of the article but less than the width of the lid to engage said overhanging lid edges, said elements extending upwardly above the article and forwardly along said conveyor member from positions below said lid when the latter is resting on the article and the article is resting on the conveyor member, a pressure member positioned above said conveyor member behind said lifting elements and engageable with the top of the lid of the article advancing on the conveyor member toward the disks, and means supporting said pressure member for movement transversely of said conveyor member and yieldably urging the pressure member toward the conveyor member to press the article against the conveyor member and increase the traction between the two.

9. In apparatus for removing from a rectangular article a lid having side edges overhanging the side walls of the article, the combination of, a horizontally disposed conveyor member for supporting and advancing the covered article along a predetermined path, two lifting elements disposed on opposite sides of said path and spaced apart a distance greater than the width of the article but less than the width of the lid to engage said overhanging lid edges, said elements extending upwardly above the article and forwardly along said conveyor member from positions below said lid when the latter is resting on the article and the article is resting on the conveyor member, a pressure member positioned above said conveyor member behind said lifting elements and engageable with the top of the lid of the article advancing on the conveyor member toward the disks, and means supporting one of said members for movement in a direction transversely of said conveyor member and yieldably urging the movable member toward the other member whereby the article is pressed against the conveyor member to increase traction between the two during advance of the member into engagement with said lifting elements.

10. In lid removing apparatus, the combination of, a conveyor for supporting and advancing a covered article along a predetermined path, a pair of disks spaced apart transversely of said path a distance greater than the width of the article but less than the width of a lid thereon and having lid engaging surfaces on their peripheries extending upwardly above the lid and forwardly along the path from positions below the edges of the lid overhanging the article, a pressure member having a lid engaging surface spaced along said path behind said disks and positioned in the path of the lid of an article on said conveyor to engage the top of the lid as the article passes beneath the member, and means for advancing said conveyor and said lid engaging surfaces of said disks and said member forwardly and in the same direction along said path, said member cooperating with said conveyor to advance the lid against and onto said disk peripheries and with the latter to lift the lid and carry the same away from the article.

11. In lid removing apparatus, the combination of, a conveyor for supporting and advancing a covered article along a predetermined path, a pair of disks spaced apart transversely of said path a distance greater than the width of the article but less than the width of a lid thereon, means rotatably supporting said disks for movement of points on the peripheries thereof upwardly above the lid and forwardly along the path from positions below the edges of the lid overhanging the article, a pressure member having a lid engaging surface spaced along said path behind said disks and positioned in the path of the lid of an article on said conveyor to engage the top of the lid as the article passes beneath the member, and means for advancing said conveyor and said lid engaging surface of said member forwardly and in the same direction along said path, said member cooperating with said conveyor to advance the lid against and onto said disk peripheries and with the latter to lift the lid and carry the same away from the article.

12. In lid removing apparatus, the combination of, a conveyor for supporting and advancing a covered article along a predetermined path, a pair of lifting elements spaced apart transversely of said path a distance greater than the width of the article but less than the width of a lid thereon and extending upwardly above the lid from positions below overhanging edges of the lid, a pressure member having a lid engaging surface spaced along said path behind said lifting elements and positioned to engage the top of the lid of an article on said conveyor, and means for advancing said conveyor and said lid engaging surface of said pressure member forwardly and in the same direction toward said lifting elements for cooperation of the conveyor and the member to advance the covered article and the lid thereon toward the lifting elements and the lid into engagement with the latter and upwardly over the same and away from the article.

No references cited.